US012626426B2

(12) United States Patent
Ji et al.

(10) Patent No.: US 12,626,426 B2
(45) Date of Patent: May 12, 2026

(54) IMAGE GENERATION METHOD AND APPARATUS, ELECTRONIC DEVICE, AND READABLE STORAGE MEDIUM

(71) Applicant: VIVO MOBILE COMMUNICATION CO., LTD., Guangdong (CN)

(72) Inventors: Wenbin Ji, Guangdong (CN); Hongli Wang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 187 days.

(21) Appl. No.: 18/400,122

(22) Filed: Dec. 29, 2023

(65) Prior Publication Data

US 2024/0135602 A1 Apr. 25, 2024
US 2024/0233209 A9 Jul. 11, 2024

Related U.S. Application Data

(63) Continuation of application No. PCT/CN2022/101464, filed on Jun. 27, 2022.

(30) Foreign Application Priority Data

Jun. 30, 2021 (CN) .......................... 202110736284.0

(51) Int. Cl.
*G06T 11/00* (2026.01)
*G06T 7/50* (2017.01)
(Continued)

(52) U.S. Cl.
CPC ................ *G06T 11/10* (2026.01); *G06T 7/50* (2017.01); *G06T 7/90* (2017.01); *G06V 10/44* (2022.01);
(Continued)

(58) Field of Classification Search
CPC . G06T 11/001; G06T 7/10; G06T 7/50; G06T 7/90; G06T 2207/10024;
(Continued)

(56) References Cited

U.S. PATENT DOCUMENTS 11,107,228 B1 * 8/2021 Shrivastava ............ G06T 11/00
2002/0080141 A1 * 6/2002 Imai ........................ G06T 15/40
345/422
(Continued)

FOREIGN PATENT DOCUMENTS

CN 106846390 A 6/2017
CN 108846792 A 11/2018
(Continued)

OTHER PUBLICATIONS

First Office Action for Chinese Application No. 202110736284.0, dated Jul. 28, 2023, 7 Pages.
(Continued)

*Primary Examiner* — Wesner Sajous
(74) *Attorney, Agent, or Firm* — BROOKS KUSHMAN P.C.

(57) ABSTRACT

An image generation method and apparatus, an electronic device, and a readable storage medium. In the image generation method, a first image is acquired, and a target feature of the first image is acquired according to depth information and image content information of the first image, so that a corresponding target feature can be acquired according to image information, thereby facilitating generation of diversified images; and a second image is generated according to the target feature, where the target feature includes color information, and if the depth information and the image content information indicate that the first image includes a subject, the target feature further includes contour information of the subject; or if the depth information and the image
(Continued)

S103

Acquire the target feature ⟋ S1031

The depth information and the image content information indicate whether the first image includes a subject ⟋ S1032

No

Yes

Determine a position of each of the Q pieces of contour information ⟋ S1033

Fill the positions of the Q pieces of contour information with the P pieces of color information, and generate the second image ⟋ S1034

Determine a position of each of the R pieces of material information ⟋ S1035

Fill the positions of the R pieces of material information with the P pieces of color information, and generate the second image ⟋ S1036 content information indicate that the first image does not include a subject, the target feature further includes material information.

14 Claims, 9 Drawing Sheets

(51) Int. Cl.
| | |
|---|---|
| *G06T 7/90* | (2017.01) |
| *G06T 11/10* | (2026.01) |
| *G06V 10/44* | (2022.01) |
| *G06V 10/46* | (2022.01) |
| *G06V 10/56* | (2022.01) |
| *G06V 10/764* | (2022.01) |

(52) U.S. Cl.
CPC .............. *G06V 10/46* (2022.01); *G06V 10/56* (2022.01); *G06V 10/764* (2022.01); *G06T 2207/10024* (2013.01)

(58) Field of Classification Search
CPC . G06T 2207/20084; G06T 2207/10028; G06T 2207/30204; G06T 3/04; G06T 3/16; G06T 7/593; G06T 2207/10012; G06T 2207/20021; G06T 15/005; G06T 15/40; G06T 1/20; G06V 10/56; G06V 10/44; G06V 10/46; G06V 10/764; G06V 10/82; G06V 10/774; G06F 18/24; Y02T 10/40; G09G 5/02; G09G 5/06; G09G 5/10; G09G 5/14; G09G 5/30; G09G 5/32; G09G 5/393; G09G 2320/0271–0276; G09G 2320/06–0666

See application file for complete search history.

(56) References Cited

U.S. PATENT DOCUMENTS

| | | | | |
|---|---|---|---|---|
| 2010/0246938 | A1* | 9/2010 | Shao ...................... | G06T 7/593 |
| | | | | 382/199 |
| 2020/0389573 | A1 | 12/2020 | Kobayashi | |

FOREIGN PATENT DOCUMENTS

| | | | | |
|---|---|---|---|---|
| CN | 110012229 | A | 7/2019 | |
| CN | 110047122 | A | 7/2019 | |
| CN | 110335216 | A | 10/2019 | |
| CN | 110378838 | A * | 10/2019 | .............. G06T 3/00 |
| CN | 110610504 | A | 12/2019 | |
| CN | 111385481 | A | 7/2020 | |
| CN | 113470138 | A | 10/2021 | |
| JP | 2015069238 | A | 4/2015 | |

OTHER PUBLICATIONS

International Search Report and Written Opinion for Application No. PCT /CN2022/101464, dated Sep. 28, 2022, 8 Pages.

* cited by examiner

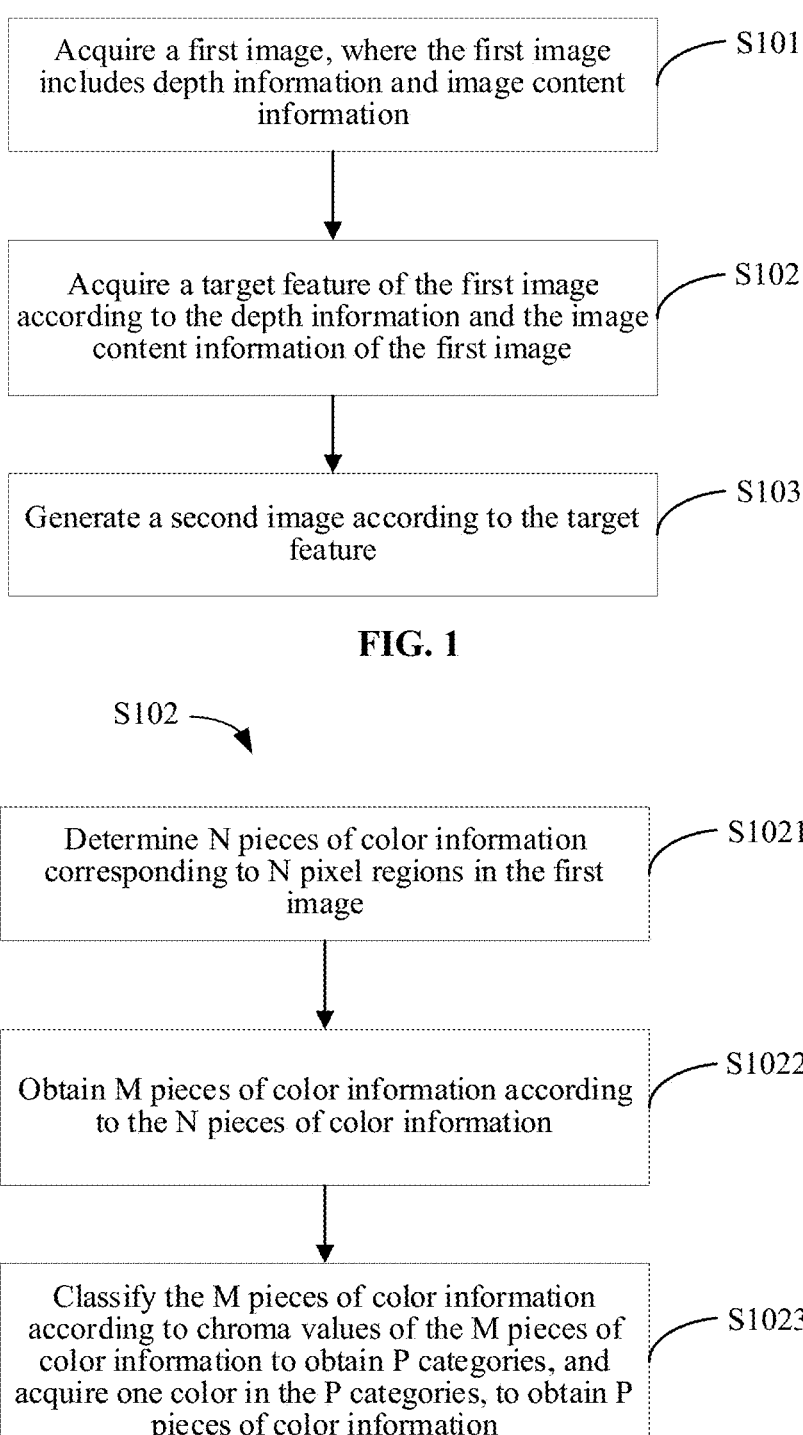

Acquire a first image, where the first image includes depth information and image content information — S101

Acquire a target feature of the first image according to the depth information and the image content information of the first image — S102

Generate a second image according to the target feature — S103

Determine N pieces of color information corresponding to N pixel regions in the first image — S1021

Obtain M pieces of color information according to the N pieces of color information — S1022

Classify the M pieces of color information according to chroma values of the M pieces of color information to obtain P categories, and acquire one color in the P categories, to obtain P pieces of color information — S1023

S1031
Acquire the target feature

S1032
The depth information and the image content information indicate whether the first image includes a subject No Yes S1033
Determine a position of each of the Q pieces of contour information S1034
Fill the positions of the Q pieces of contour information with the P pieces of color information, and generate the second image S1035
Determine a position of each of the R pieces of material information S1036
Fill the positions of the R pieces of material information with the P pieces of color information, and generate the second image

FIG. 5

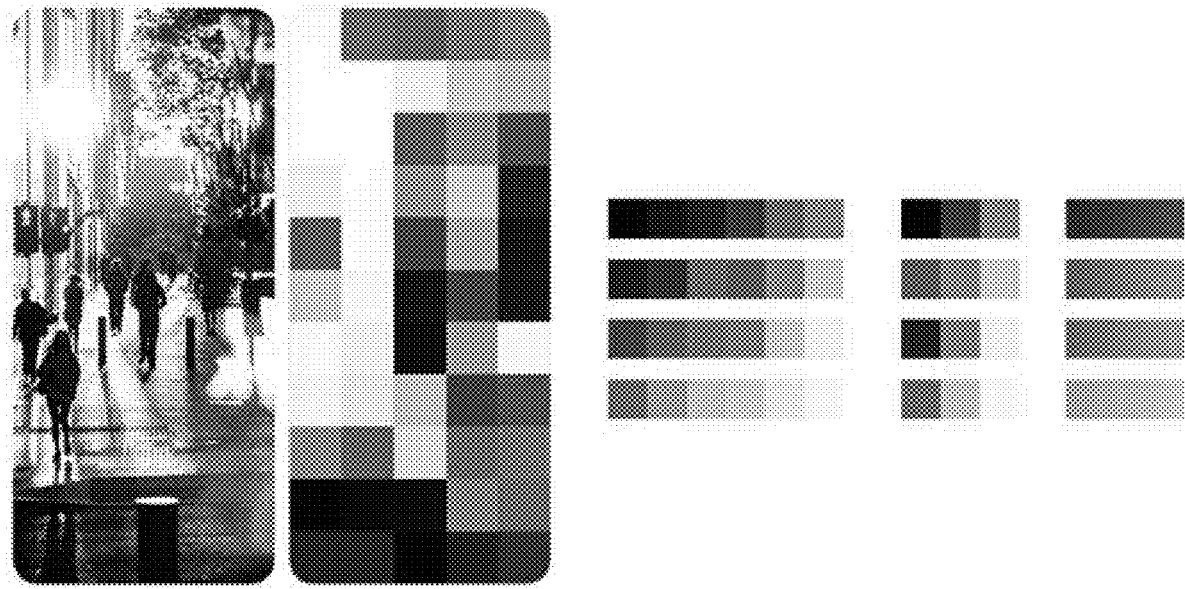

IMAGE GENERATION METHOD AND APPARATUS, ELECTRONIC DEVICE, AND READABLE STORAGE MEDIUM

CROSS-REFERENCE TO RELATED APPLICATIONS

This application is a continuation of PCT International Application No. PCT/CN2022/101464 filed on Jun. 27, 2022, which claims priority to Chinese Patent Application No. 202110736284.0 filed on Jun. 30, 2021, which are incorporated herein by reference in their entireties.

TECHNICAL FIELD

This application relates to the field of image processing technologies, and specifically, to an image generation method and apparatus, an electronic device, and a readable storage medium.

BACKGROUND

With the development of science and technology and the improvement of people's living standards, the development of electronic devices, such as smartphones, smart tablets, and smart watches, is accelerating, and functions that can be implemented by the electronic devices are increasing. For example, image processing functions also become increasingly diverse.

Currently, in the process of users using electronic devices such as smartphones, smart tablets, and smart watches, users can process images of the electronic devices according to their requirements, for example, edit the images, or select and set the images in a personalized manner.

During implementation of this application, the inventor found at least the following problems in the prior art: in the process of image processing, richer image resources cannot be provided according to image information.

SUMMARY

According to a first aspect, an embodiment of this application provides an image generation method, the method including:

acquiring a first image, where the first image includes depth information and image content information;

acquiring a target feature of the first image according to the depth information and the image content information of the first image; and generating a second image according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information.

According to second aspect, an embodiment of this application provides an image generation apparatus, the apparatus including:

an acquisition module, configured to: acquire a first image, where the first image includes depth information and image content information; and acquire a target feature of the first image according to the depth information and the image content information of the first image; and

a generation module, configured to generate a second image according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information.

According to a third aspect, an embodiment of this application provides an electronic device. The electronic device includes a processor, a memory, and a program or instructions stored in the memory and runnable on the processor, the program or instructions, when executed by the processor, implementing steps of the image generation method according to the first aspect.

According to a fourth aspect, an embodiment of this application provides a readable storage medium. The readable storage medium stores a program or instructions, the program or instructions, when executed by a processor, implementing steps of the image generation method according to the first aspect.

According to a fifth aspect, an embodiment of this application provides a chip. The chip includes a processor and a communication interface, where the communication interface is coupled to the processor, and the processor is configured to run a program or instructions, to implement the image generation method according to the first aspect.

According to a sixth aspect, an embodiment of this application provides a computer program product. The computer program product is stored in a non-volatile storage medium, and executed by at least one processor to implement the image generation method according to the first aspect.

According to a seventh aspect, an embodiment of this application provides an electronic device, configured to perform the image generation method according to the first aspect.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements in the accompanying drawings that have same reference numerals are represented as similar elements, and unless otherwise particularly stated, the figures in the accompanying drawings are not drawn to scale.

FIG. 1 is a schematic flowchart of an image generation method according to an embodiment of this application;

FIG. 2 is a detailed flowchart of step S102 in FIG. 1;

FIG. 5 is a detailed flowchart of step S103 in FIG. 1;

FIG. 6a is a schematic diagram 1 of generating a second image according to an embodiment of this application;

DETAILED DESCRIPTION

Figures 3, 4:
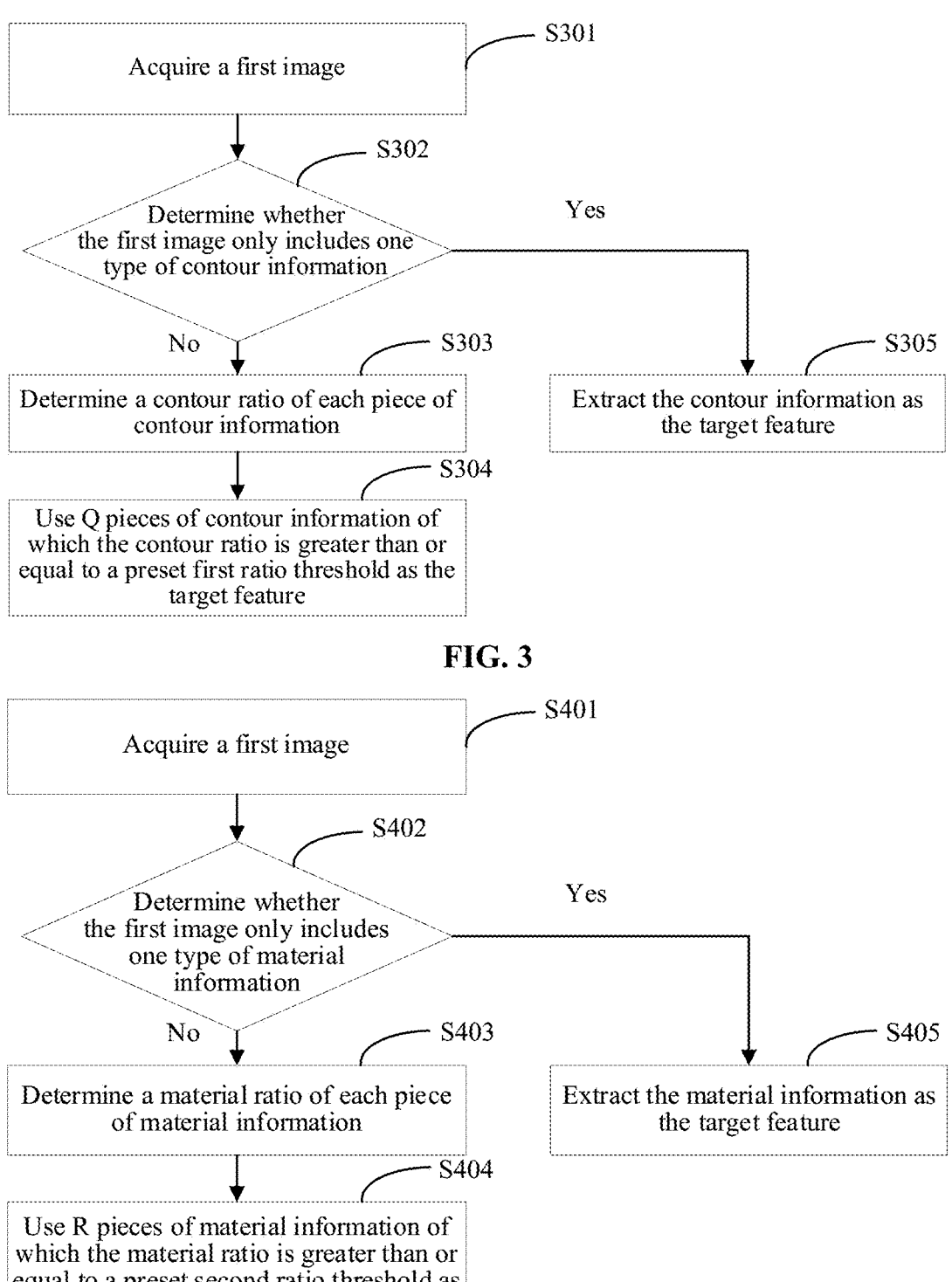
FIG. 3 is a schematic flowchart of extracting contour information of a subject of a first image according to an embodiment of this application.
FIG. 4 is a schematic flowchart of extracting material information of a first image according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

The terms such as "first" and "second" in the specification and the claims of this application are intended to distinguish between similar objects, but are not used for describing a specific sequence or a chronological order. It is to be understood that the data termed in such a way are interchangeable in appropriate circumstances, so that the embodiments of this application can be implemented in orders other than the order illustrated or described herein. In addition, the objects distinguished by "first", "second" and the like are generally of one type, and the quantity of the objects is not limited. For example, there may be one or more first objects. In addition, "and/or" used in the specification and the claims represents at least one of the connected objects, and the character "/" generally indicates an "or" relationship between the associated objects.

Before this application is described in detail, nouns and terms involved in the embodiments of this application are described. The nouns and terms involved in the embodiments of this application are applicable to the following explanations:

(1) Color feature: It refers to a color or a color combination in an image, for example, single colors such as yellow, purple, or blue, or a color combination of yellow, purple, and blue.

(2) Style feature: It refers to a style in the image, for example, shapes such as a curve, a straight line, a point, a triangle, or a circle.

(3) Material feature: It refers to a material in the image, for example, materials such as metal, wood, cement, or glass.

(4) Pixel region: It refers to a region occupying a certain area in the image, which is formed by one or more pixel points.

(5) Main color: It refers to a color extracted by removing a repeated color in the image, or removing a preset color in the image.

(6) Color block color: It refers to a color further extracted from the main color, which is used for combination with the shape to generate an image.

An image generation method provided in the embodiments of this application is described in detail below with reference to the accompanying drawings by using specific embodiments and application scenarios of the specific embodiments.

FIG. 1 is a schematic flowchart of an image generation method according to an embodiment of this application.

The image generation method is applied to an electronic device. Specifically, the image generation method is performed by one or more processors of the electronic device.

As shown in FIG. 1, the image generation method includes the following steps:

Step S101: Acquire a first image, where the first image includes depth information and image content information.

The first image is acquired by a camera of the electronic device, or the first image is selected by a user from an album of the electronic device, or the first image is selected by the user from images locally stored in the electronic device, or the first image is downloaded from a server by the user.

Specifically, the first image is a depth image with depth information, and the electronic device may acquire the depth information of the first image. For example, the electronic device may acquire the depth information of the first image through a built-in or external image depth detection apparatus. In practical applications, the image depth detection apparatus may include a binocular stereo vision apparatus, a time of flight (TOF) apparatus, or a structured light apparatus.

The binocular stereo vision apparatus may imitate the process of observing an object with two eyes, thereby using the principle of existence of a parallax between the left and right eyes to determine depth information of the photographed object. The binocular stereo vision apparatus may specifically include two depth cameras with fixed positions and a fixed distance, so that the depth of each object in the first image is detected by imitating the left eye and the right eye respectively, and then the depth information of each object in the first image is calculated according to a depth error between the two depth cameras, and the positions and the distance of the two depth cameras. For the specific process of acquiring depth information of a target image through the image depth detection apparatus, reference may be made to related art, and details are not described herein again.

The time of flight apparatus may specifically include an optical pulse generator and a sensor. The optical pulse generator may send a light pulse to each object in the first image, then receive the light pulse reflected from each object through the sensor, calculate a time of flight of the light pulse, that is, a round-trip time of the light pulse, and then may multiply ½ of the time of flight by the speed of light, so as to obtain depth information of each object in the first image.

The structured light apparatus may specifically include an infrared laser projector and an infrared camera. The infrared laser projector may emit infrared laser light, and then the infrared laser light may be converged into a narrow light band after passing through a cylindrical lens, which is referred to as structured light. The infrared laser projector may project structured light with certain structural features onto the photographed object, and then the infrared camera performs acquisition. The light with certain structural features, when reflected by different depth regions of the object, is equivalent to undergoing different degrees of phase modulation, then the infrared camera may acquire different image phase information, and subsequently this phase change may be converted into depth information.

It is to be noted that, specific internal components of the binocular stereo vision apparatus, the time of flight apparatus, and the structured light apparatus are not specifically limited in the embodiments of this application, and the specific calculation process for obtaining the depth information of each of the foregoing apparatuses is not specifically limited in the embodiments of this application. For the specific structure and the specific calculation process of depth information of each of the foregoing apparatuses, reference may be made to related art.

Specifically, the first image is an image with image content information, and the image content information is a specific feature in the image. The specific feature corresponds to a specific region, and the specific region has a contour. For example: a character, an object, a landscape, and the like have contour features.

It is to be further noted that, the execution order of obtaining the depth information and the image content information of the first image is not specifically limited in the embodiments of this application. In practical applications, the depth information of the first image may be first acquired, and then the image content information is acquired, or certainly, the depth information and the image content information of the first image may be acquired simultaneously.

Step S102: Acquire a target feature of the first image according to the depth information and the image content information of the first image.

The target feature includes at least one of color information, contour information, or material information, and the processor of the electronic device extracts the target feature in the first image, that is, at least one of the color information, the contour information, or the material information.

Specifically, in a case that the depth information and the image content information indicate that the first image includes a subject, the target feature includes color information and contour information of the subject; or in a case that the depth information and the image content information indicate that the first image does not include a subject, the target feature includes color information and material information.

In the embodiments of this application, determining the depth information and the image content information indicate whether the first image includes a subject includes:

determining whether the first image is a three-dimensional image according to the depth information; and if the first image is a three-dimensional image, further determining whether there is a to-be-identified region corresponding to a specified feature in the first image based on the image content information, and if there is a to-be-identified region corresponding to the specified feature in the first image, determining that the first image includes a subject; or if there is no to-be-identified region corresponding to the specified feature in the first image, determining that the first image does not include a subject.

Specifically, the determining whether there is a to-be-identified region corresponding to a specified feature in the first image includes:

specifying an associated specified feature for the subject part in advance, and detecting whether there is a region corresponding to the specified feature in the first image; and if there is a region corresponding to the specified feature in the first image, performing contour detection on the region corresponding to the specified feature in the first image, and performing verification on the detected region according to a neural network model corresponding to the specified feature; and if it is confirmed that the region is a to-be-identified region corresponding to the specified feature, determining that there is a to-be-identified region corresponding to the specified feature in the first image, and in this case, determining that the first image includes a subject; or if there is no region corresponding to the specified feature in the first image, determining that the first image does not include a subject.

Specifically, the target feature includes color information, and the color information includes at least one color. The electronic device in this embodiment of this application is provided with a graphics processing unit (GPU) and a central processing unit (CPU). The graphics processing unit includes a color picker, and a color value in the first image is extracted through the color picker in the graphics processing unit, and then uploaded to the central processing unit.

Step S103: Generate a second image according to the target feature.

Specifically, in a case that the depth information and the image content information indicate that the first image includes a subject, the color information and the contour information of the subject in the target feature are combined to generate the second image; or in a case that the depth information and the image content information indicate that the first image does not include a subject, the color information and the material information in the target feature are combined to generate the second image.

FIG. 2 is a detailed flowchart of step S102 in FIG. 1.

As shown in FIG. 2, step S102 of acquiring a target feature of the first image according to the depth information and the image content information of the first image includes:

Step S1021: Determine N pieces of color information corresponding to N pixel regions in the first image.

Specifically, the first image is divided into N pixel regions with equal areas, and color information corresponding to each pixel region is determined, where N is a first preset quantity, each pixel region corresponds to one piece of color information, and each pixel region includes a plurality of pixels. For example, the first image is divided into 55 pixel regions with equal areas. It may be understood that, the first preset quantity N may be set according to a specific requirement. For example: the first preset quantity N is determined according to resolution of the first image, where the resolution is positively correlated with the first preset quantity N. For example: the first preset quantity N is proportional to the resolution of the first image.

Specifically, determining the color information corresponding to each pixel region includes the following:

Each pixel region includes a plurality of pixel points, an average value of each color component of the plurality of pixel points is calculated, and the average value of each color component is used as a color of each pixel region. For example, if the color components are red green blue (RGB) components, values of the R color component, the G color component, and the B color component of each pixel point in each pixel region are acquired, and an average value of the R color component, the G color component, and the B color component of all pixel points in each pixel region is calculated. The average value of the R color component, the G color component, and the B color component of all pixel points is used as the color of each pixel region, where the color of each pixel region is represented by RGB (R, G, B). It may be understood that, in this embodiment of this application, the color mode being an RGB mode is used for illustration, and the color mode may alternatively be a hue-saturation-brightness (HSB) mode, a printing color mode (Cyan-Magenta-Yellow-Black, CMYK) mode, a Lab mode, or other color modes, which is not limited herein.

Step S1022: Obtain M pieces of color information according to the N pieces of color information.

the M pieces of color information do not include same color information or preset color information, both N and M are positive integers, and N≥M.

Specifically, the M pieces of color information are main colors, and the obtaining M pieces of color information according to the N pieces of color information includes the following steps:

(1) Merge Repeated Colors in N Pixel Regions.

Specifically, after the color of each pixel region is determined, same colors in the plurality of pixel regions are merged. For example: same colors in the plurality of pixel regions are merged into one color, or each color component within a preset range in the colors corresponding to a plurality of pixel regions in any color mode is merged to generate a new color component, to generate a color obtained after merging. For example: the color mode is the RGB mode, color components corresponding to colors of a first pixel region are (R1, G1, B1), and color components corresponding to colors of a second pixel region are (R2, G2, B2), where a difference between the red components R1 and R2 is within the preset range, a difference between the green components G1 and G2 is within the preset range, and a difference between the blue components B1 and B2 is within the preset range, then color merging is performed on the first pixel region and the second pixel region, and color components obtained after merging are ((R1+R2)/2, (G1+G2)/2, (B1+B2)/2).

(2) Remove a Preset Color.

Specifically, the preset color is a color set in advance, for example, white, and white is deleted from a plurality of colors, to obtain a second preset quantity M pieces of color information from the first preset quantity N pieces of color information, where both N and M are positive integers and N≥M.

In the embodiments of this application, by performing pixel region division on the first image and determining the second preset quantity of pieces of color information according to the first preset quantity of pixel regions, pixel-level processing on the first image can be realized, and the color fineness of the image can be improved.

Step S1023: Classify the M pieces of color information according to chroma values of the M pieces of color information to obtain P categories, and acquire one color in the P categories, to obtain P pieces of color information, where P is a positive integer and M≥P.

Specifically, a third preset quantity P pieces of color information are determined from the second preset quantity M pieces of color information. After the second preset quantity M pieces of color information are determined, the M pieces of color information are classified according to chroma values of the M pieces of color information with reference to the similarity principle of hue, to obtain P categories, a gradient color is made for each category, and an intermediate value of the gradient color is used as a color of each category, to obtain P pieces of color information, where P is a positive integer and M≥P. In addition, the P pieces of color information are used as the extracted target feature. For example: 12 main colors are determined, and classified into six categories according to the similarity principle of hue, gradient colors are made for the six categories, and an intermediate value of the gradient color is used as a color block color of each category, thereby determining the six color block colors as the extracted target feature.

Alternatively, the M pieces of color information are distributed among P color blocks, where the color blocks refer to color temperature region ranges, and each of the color blocks has a different color temperature region range. Preferably, one color block is correspondingly set for each color in advance in this embodiment of this application.

It may be understood that, if the first image is a monochrome planar view, the image only includes one monochrome color, that is, only includes one color. In this case, it is determined that the first image only includes one color, and this color is extracted as color information of the first image.

If the first image is a polychromatic stereogram, that is, the first image includes at least two colors, it is determined that the first image includes not only one color, and in this case, step S1021 is performed.

In the embodiments of this application, extracting the color information in the first image helps to determine the colors for composition, so as to better generate diversified images.

Specifically, the target feature further includes at least one piece of contour information. FIG. 3 is a schematic flowchart of extracting contour information of a subject of a first image according to an embodiment of this application.

As shown in FIG. 3, the extracting contour information of a subject of a first image includes:

Step S301: Acquire a first image.

Step S302: Determine whether the first image only includes one type of contour information.

Specifically, the contour information refers to a contour in the image, for example: shapes such as a curve, a straight line, a triangle, a circle, or a rectangle. In this embodiment of this application, the contour in the first image is calculated based on a wavelength, a reflectance, and a diffuse emissivity in the first image, and whether the first image includes one or more types of contours is determined. Specifically, by determining whether the first image only includes one type of contour, that is, whether the first image only includes a unique contour, if the first image only includes one type of contour, perform step S305: extract the contour information as the extracted target feature; and if the first image includes not only one type of contour information, perform step S303: determine a contour ratio of each piece of contour information.

Step S303: Determine a contour ratio of each piece of contour information.

Specifically, when the first image includes at least two types of contour information, the contour ratio of each piece of contour information is determined, where the contour ratio of the contour information is a quantity ratio of the contour information in the first image, that is, a ratio of a quantity of the contour information in the first image to a quantity of all contour information of the first image.

Step S304: Use Q pieces of contour information of which the contour ratio is greater than or equal to a preset first ratio threshold as the target feature.

Specifically, after the contour ratio of each piece of contour information is determined, the contour information of which the contour ratio is greater than or equal to the preset first ratio threshold is used as the extracted target feature For example: the first image includes three types of contour information, which are respectively circle, triangle, and rectangle, where the contour ratio of the circle is 40%, the contour ratio of the triangle is 40%, and the contour ratio of the rectangle is 10%. It is assumed that the preset first ratio threshold is 30%. In this case, the circle and the triangle are determined as the extracted target feature. In this case, two pieces of contour information are extracted.

It may be understood that, the preset first ratio threshold may be set according to a specific requirement. For example, the preset first ratio threshold is set to 20%, 25%, or 30%, which is not limited herein.

Step S305: Extract the contour information as the target feature.

Specifically, if it is determined that the first image only include one type of contour information, the contour information is directly extracted as the extracted target feature.

In the embodiments of this application, extracting the contour information in the first image helps to determine the contour for composition, so as to better generate an image.

Specifically, the target feature further includes material information. The electronic device in the embodiments of this application is provided with a material sensor. Because a density, refraction, and diffuse reflection of different materials are different, based on an analysis diagram formed by a strength, a frequency, and an amplitude of a light wave reflected back by an emitted light wave, different material types can be identified, that is, material information can be identified.

FIG. 4 is a schematic flowchart of extracting material information according to an embodiment of this application.

As shown in FIG. 4, the extracting material information of the first image includes:

Step S401: Acquire a first image.

Step S402: Determine whether the first image only includes one type of material information.

Specifically, the material information includes material information such as metal, wood, cement, and glass. It may be understood that, material information may be understood as properties of the surface of an object. The material information includes attribute information such as a texture, a color, smoothness, a transparency, a refractive index, or a reflectivity of the surface of the object. If the first image is a single-material map, the image only includes a single material, that is, includes only one type of material information. In this case, it is determined that the first image only includes one type of material information, and perform step S405: extract the material information as the target feature. If the first image is a multi-material image, it is determined that the first image includes not only one type of material information, and in this case, perform step S403: determine a material ratio of each piece of the material information.

Step S403: Determine a material ratio of each piece of material information.

Specifically, when the first image includes at least two types of material information, the material ratio of each piece of the material information is determined, where the material ratio of the material information is an area ratio of the material information in the first image, that is, a ratio of an area of a region of the material information in the first image to an area of the first image.

Step S404: Use R pieces of material information of which the material ratio is greater than or equal to a preset second ratio threshold as the target feature.

Specifically, after the material ratio of each piece of material information is determined, the material information of which the material ratio is greater than or equal to the preset second ratio threshold is used as the extracted target feature. For example, the first image includes three materials, which are wood, glass, and cement respectively, where the material ratio of wood is 40%, the material ratio of glass is 30%, and the material ratio of cement is 30%. It is assumed that the preset second ratio threshold is 30%. In this case, the material ratios of wood, glass, and cement are all greater than or equal to the preset second ratio threshold, then wood, glass, and cement are determined as the extracted target feature. In this case, two pieces of material information are extracted.

It may be understood that, the preset second ratio threshold may be set according to a specific requirement. For example, the preset second ratio threshold is set to 20%, 25%, or 30%, which is not limited herein.

Step S405: Extract the material information as the target feature.

Specifically, if it is determined that the first image only includes one type of material information, the material information is directly extracted as the extracted target feature.

In the embodiments of this application, extracting the material information in the first image helps to determine the material information for composition, so as to better generate an image.

In the embodiments of this application, the method further includes:

lightness and purity harmony is performed on the P pieces of color information to generate harmonized color information, and the harmonized color information is used as the extracted target feature. Specifically, color harmony refers to a combination of two or more colors, which includes:

(1) Same-hue color matching harmony: It refers to a harmony method in which colors of the same hue are used for combination, so that the colors have changes in both the lightness and the purity. The color selection needs to be limited to hues within any 60° angle in a hue circle. Due to the moderate distance, these hues not only have a common color appearance, but also have slight differences in the lightness and the purity.

(2) Same-lightness color matching harmony: It refers to a harmony method in which colors of the same lightness are used for combination, so that the colors have changes in both the hue and the purity. The same-lightness color matching harmony is a color combination of the same level state on the color solid, and the colors have the same lightness, so that an implicit, rich, and elegant color harmony effect can be achieved. If color matching with consistent lightness is intended to be effectively performed, the color may be replaced with gray. For example: when the lightness of certain color matching is intended to be observed, the design work of the color matching is converted into a black and white effect, and all the colors are converted into gray, then a gray color difference and a lightness difference that are shown will be equal to those of the original colors.

(3) Same-purity color matching harmony: It refers to a harmony method in which colors of the same purity are used for combination, so that the colors have changes in both the hue and the lightness. The color matching harmony effect of colors of the same purity is most significant, but a dirty, gray, and poor effect is also easy to be obtained. It is to be noted that by moderately dissimilating the hue and the lightness of colors, a good visual effect can be achieved. For example: ①: All of high purity. High-purity colors are uniformly used for color matching. Because these colors all have relatively strong personalities, when they are matched together, a stronger contrast effect will be produced, providing people with an uplifting and positive feeling. ②: All of medium purity. Colors are unified with a medium purity, thereby bringing a joy, lively, bright, and warm feeling. ③: All of low purity. Color matching is unified by using low-purity colors, which make the overall picture provide people with a cozy, stable, and calm feeling.

(4) Interval color harmony: It means that if there is a conflict between colors, gray or the same series of colors may be inserted to harmonize the colors. An interval color refers to a color used for separating colors, that is, using a third-party color to perform color blending on two existing colors, so as to reduce the degree of contrast between the two colors. This method can make the picture cozy and vivid, and exciting and elegant.

(5) Gradient color harmony: It refers to a color matching manner of making changes in stages by following certain rules. Gradient colors will present different feelings according to different selected colors. Gradient colors formed by colors with high lightness and high purity can show a sweet and naive atmosphere; and gradient colors formed by colors with low lightness and low purity can show a mature and weird atmosphere.

(6) Natural color harmony: It refers to the use of colors in the nature for color matching, for example, colors in the nature such as: trees, soil, flowers, rivers, or fields. When photos are used in the design, colors may be extracted from the photos for color matching. The colors extracted in this manner can make people feel the overall coordination.

(7) Tone harmony: It refers to performing harmony on tones, for example: ①: Bright tone. Using a combination of high lightness and high purity is color matching of a bright tone, which can provide people with a spirited and refreshing feeling. For works using high-purity tones, colors are not limited to a certain part, but color matching is performed in an embedding-around manner. ②: Dark gray tone. Using a combination of low lightness and low purity is color matching of a dark gray tone, which can make people feel a calm atmosphere.

(8) Achromatic color harmony: It refers to a harmony method in which black, white, and gray that are all achromatic are used for combination. Achromatic color harmony is the easiest color matching method to achieve a harmony effect because black, white, and gray are neutral colors, which have the characteristics of stability, modesty, and standing aloof from worldly success. Gray often plays the role of transition and connection.

Preferably, gradient color harmony is used in this embodiment of this application, and lightness and purity harmony is performed on the P pieces of color information through the gradient color harmony, so that colors of the first image can be better reflected.

FIG. 5 is a detailed flowchart of step S103 in FIG. 1.

As shown in FIG. 5, step S103 of generating a second image according to the target feature includes:

Step S1031: Acquire the target feature.

Step S1032: The depth information and the image content information indicate whether the first image includes a subject.

Specifically, if the depth information and the image content information indicate that the first image includes a subject, perform step S1033: determine a position of each of the Q pieces of contour information; and if the depth information and the image content information indicate that the first image does not include a subject, perform step S1035: determine a position of each of the R pieces of material information.

Step S1033: Determine a position of each of the Q pieces of contour information.

Specifically, the position of each piece of contour information in the second image is determined according to the position of each piece of contour information in the first image. For example, it will be determined that each piece of contour information in the second image and the contour information in the first image are located at same positions or at similar orientations in the images; or the position of each of the Q pieces of contour information is randomly determined.

Step S1034: Fill the positions of the Q pieces of contour information with the P pieces of color information, and generate the second image.

Specifically, the extracted P pieces of color information are acquired, and the extracted Q pieces of contour information are acquired;

X colors are randomly selected from the extracted P pieces of color information, and (X−1) types of contour information are randomly selected from the extracted Q pieces of contour information, where X is a positive integer and X≥2; and an area of each piece of contour information is determined according to the contour ratio of each piece of contour information, one type of color information is randomly filled for each piece of contour information, the remaining region is filled with the remaining one type of color information, and the second image is generated in combination with the position of each of the Q pieces of contour information, where the remaining region is a region in the second image other than regions at which the contour information is located.

Step S1035: Determine a position of each of the R pieces of material information.

Specifically, the position of each piece of material information in the second image is determined according to the position of each piece of material information in the first image. For example, it will be determined that each piece of material information in the second image and the material information in the first image are located at same positions or at similar orientations in the images; or the position of each of the R pieces of material information is randomly determined.

Step S1036: Fill the positions of the R pieces of material information with the P pieces of color information, and generate the second image.

The extracted P pieces of color information are acquired, and the extracted R pieces of material information are acquired;

A colors are randomly selected from the extracted P pieces of color information, and (A−1) materials are randomly selected from the extracted R pieces of material information, where A is a positive integer and A≥2; and an area of each piece of material information is determined according to the material ratio of each piece of material information, one type of color information is randomly filled for each material, the remaining region is filled with the remaining one type of color information, and the second image is generated in combination with the position of each of the R pieces of material information, where the remaining region is a region in the second image other than regions at which the contour information is located.

FIG. 6a is a schematic diagram 1 of generating a second image according to an embodiment of this application.

As shown in FIG. 6a, the electronic device is a smartphone, and the first image is an image acquired by a camera of the electronic device. The first image is divided into 55 pixel regions with the same area, and then 12 main colors are determined from the 55 pixel regions with the same area, and classified into six categories according to the similarity principle of hue, gradient colors are made for the six categories, and an intermediate value of the gradient colors is used as a color block color of each category, thereby determining six color block colors as an extracted color feature.

In the embodiments of this application, by using the second preset quantity M of main colors to determine the third preset quantity P of color block colors, the color feature in the first image can be better extracted, thereby facilitating generation of an image with rich colors.

In the embodiments of this application, the method further includes:

combining the extracted color information and preset shapes, and randomly filling each of the preset shapes with a color block color according to a picture ratio corresponding to each of the preset shapes, to generate a second image.

The preset shapes are graphic contours pre-stored in the electronic device, such as a circle, a triangle, a rectangle, a square, and an ellipse. The user may customize one or more shapes in the electronic device, and store the customized shapes in the electronic device, for example, customizing a polygon, a cylinder, a parallelogram, a trapezoid, a cube, a four-pointed star, a five-pointed star, an N-pointed star, an N-sided polygon, a ring, or other irregular graphics.

Specifically, several pieces of color information are randomly selected from the third preset quantity P pieces of color information. For example, the third preset quantity is six, and three pieces of color information are selected from the six pieces of color information for filling.

The quantity of preset shapes does not exceed P, so that each piece of color information is at least in a one-to-one correspondence with one preset shape, where the picture ratio corresponding to each preset shape is positively correlated with a color ratio of the color information. It may be understood that, because there are remaining regions in the image in addition to the preset shapes, in order to better performing color filling, the quantity of color information to be filled is set to N+1, where N is the quantity of preset shapes, so that each region in the image is filled with color information, thereby enriching colors of the image.

In the embodiments of this application, a position corresponding to each preset shape may be randomly determined, and randomly distributed in the second image, that is, the preset shapes are randomly typeset on the image of the electronic device according to the picture ratio of each preset shape, to generate a second image.

Figures 6B, 6C:
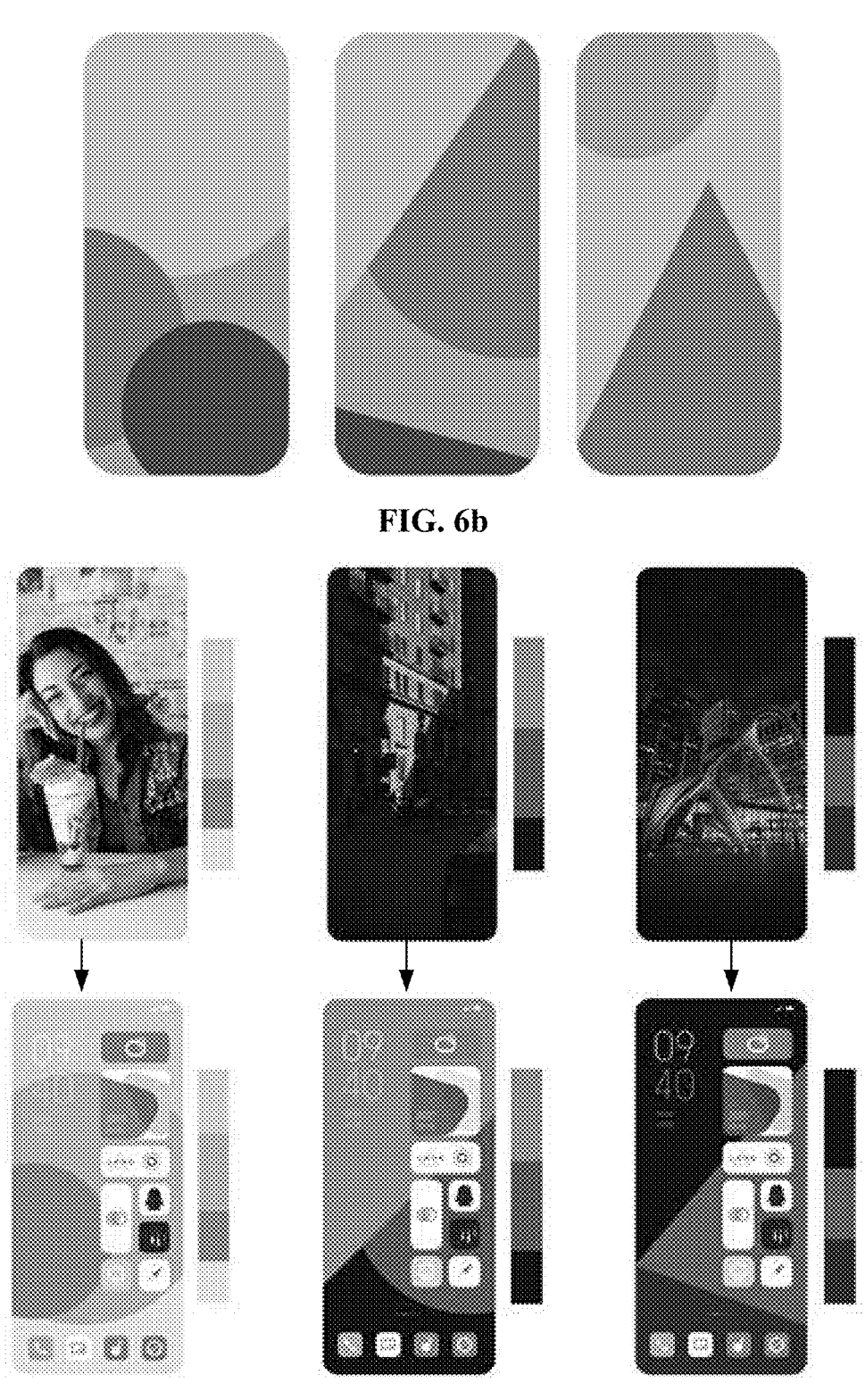
FIG. 6b is a schematic diagram 2 of generating a second image according to an embodiment of this application.
FIG. 6c is a schematic diagram 3 of generating a second image according to an embodiment of this application.

FIG. 6b is a schematic diagram 2 of generating a second image according to an embodiment of this application.

As shown in FIG. 6b, by filling the preset shapes with several pieces of color information, the preset shapes are randomly typeset, so as to generate the second image.

FIG. 6c is a schematic diagram 3 of generating a second image according to an embodiment of this application.

As shown in FIG. 6c, after the first image is acquired, the target feature of the first image is extracted, where the target feature includes color information; and by combining several types of color information and the preset shapes, a second image of the electronic device is generated, and the second image is set as a background image of the electronic device.

Figures 7A, 7B, 7C:
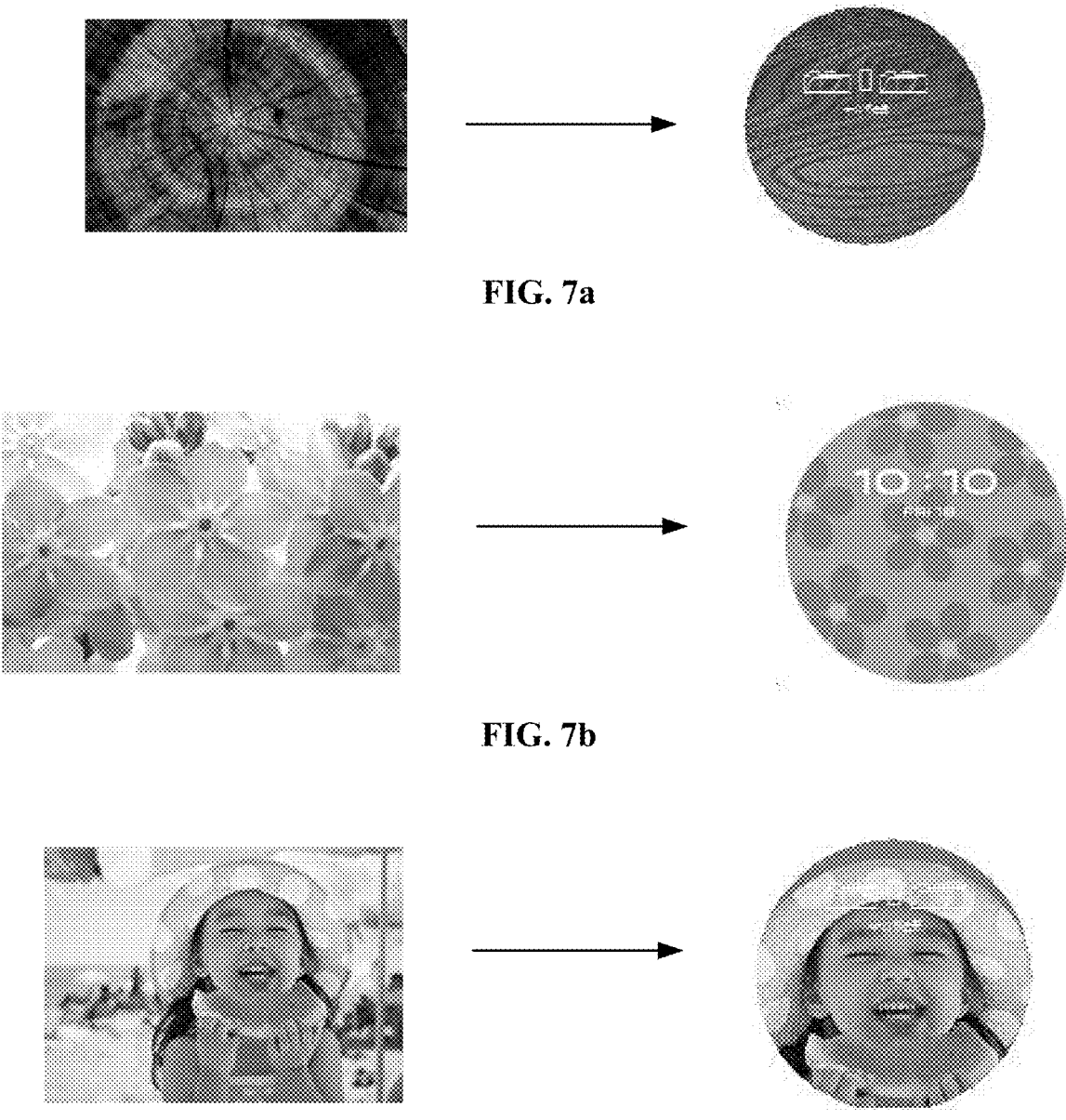
FIG. 7a is another schematic diagram 1 of generating a second image according to an embodiment of this application.
FIG. 7b is another schematic diagram 2 of generating a second image according to an embodiment of this application.
FIG. 7c is another schematic diagram 3 of generating a second image according to an embodiment of this application.

FIG. 7a is another schematic diagram 1 of generating a second image according to an embodiment of this application.

As shown in FIG. 7a, the electronic device is a smart watch, and the dial of the smart watch is circular. One type of material information is extracted from the first image, where the material information is wood. The material information is combined with a preset color, to determine an area of the material, and determine a position of the material information. A second image is generated, and the second image is set as a background image of the smart watch.

It may be understood that, a display interface of the smart watch further includes a system display control and/or a system display widget, and the system display control and/or system display widget are presented on the display interface of the smart watch in a preset display mode. The preset display mode includes at least one of a display color, a display size, or a display position of the system display control and/or the system display widget.

FIG. 7b is another schematic diagram 2 of generating a second image according to an embodiment of this application.

As shown in FIG. 7b, the electronic device is a smart watch. By performing target feature extraction on the first image, color information and contour information are extracted, a second image is generated according to the extracted color information and contour information, and the second image is used as a background image of the smart watch.

In the embodiments of this application, the depth information and the image content information in the first image are acquired, and the depth information and image content information indicate whether the first image includes a subject, so that the target feature of the first image can be better used for combination to generate diversified images, thereby improving image richness.

In the embodiments of this application, the target feature of the first image further includes character information, and the method further includes:

extracting the character information of the first image; and generating a second image of the electronic device according to the extracted character information and based on a preset background template.

Specifically, the character information includes a head portrait, a half-length photo, or a full-length photo, and each piece of character information corresponds to a preset background template. By identifying a type of the character information, the corresponding background template is determined, to generate a second image of the electronic device. It may be understood that, the preset background template is set according to a specific requirement, for example: set to a background template with a single color, or a background template with a plurality of colors.

FIG. 7c is another schematic diagram 3 of generating a second image according to an embodiment of this application.

As shown in FIG. 7c, the electronic device is a smart watch, and an identified head portrait of the character is combined with a background template with a single color, to generate a second image of the smart watch, and the second image is used as the background of the smart watch.

In the embodiments of this application, because the first image may have various target features, for example, one or more of color information, contour information, or material information are extracted, a plurality of different second images may be generated based on the same first image.

In order to realize personalized style selection, in this embodiment of this application, a plurality of different second images may alternatively be generated based on the first image, and the user selects one of the plurality of second images as a background image of the electronic device, for example, receives an image selection instruction, selects one from the plurality of second images as a target image, and sets the target image as the background image of the electronic device.

Figure 7D:
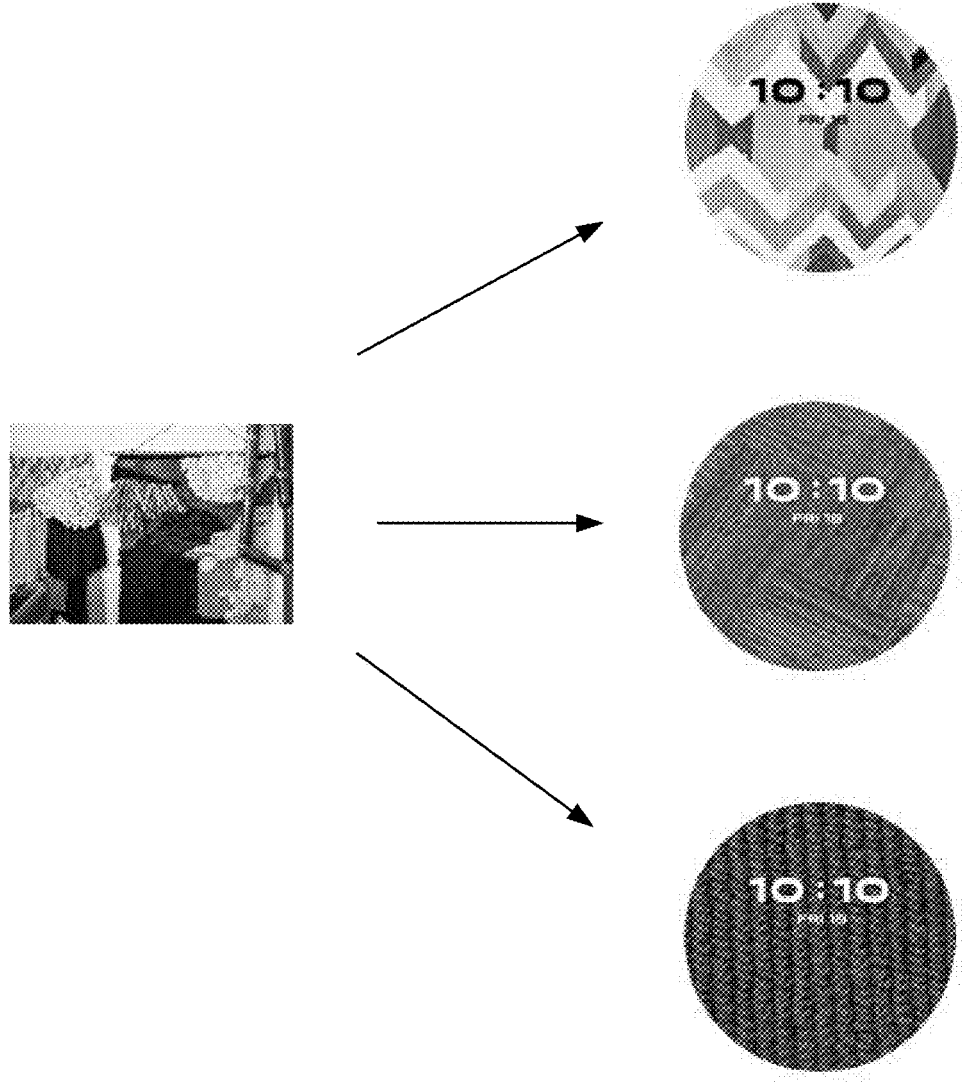
FIG. 7d is another schematic diagram 4 of generating a second image according to an embodiment of this application.

FIG. 7d is another schematic diagram 4 of generating a second image according to an embodiment of this application.

As shown in FIG. 7d, three different second images are generated from the first image, so that the user may select one of the three second images as the background image of the electronic device.

In the embodiments of this application, because the target feature extraction on the first image and the image generation need to consume the computing processing performance and the graphics processing performance of the electronic device, in order to increase the processing speed, in this embodiment of this application, the target feature extraction on the first image and the generation of the second image may alternatively be implemented through a server, to save the performance of the electronic device and further increase the speed of image generation.

Figure 8:
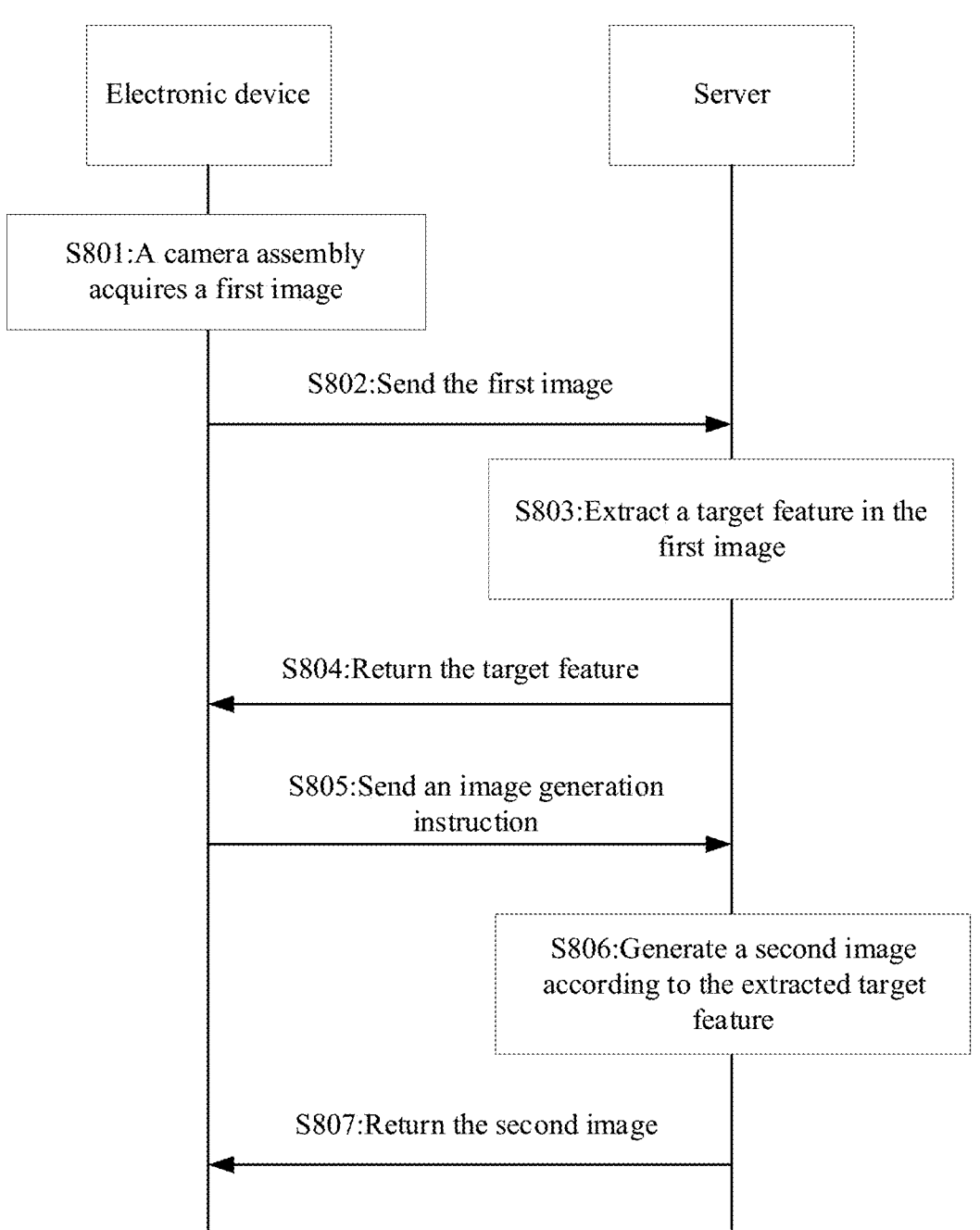
FIG. 8 is another schematic flowchart of an image generation method according to an embodiment of this application.

Specifically, FIG. 8 is another schematic flowchart of an image generation method according to an embodiment of this application.

As shown in FIG. 8, the image generation method includes the following steps:

Step S801: A camera assembly acquires a first image.

Specifically, the camera assembly of an electronic device performs photographing to acquire the first image. In the embodiments of this application, the camera assembly may include a camera. Optionally, the camera may have many lenses, such as a structured light lens, a wide-angle lens, an infrared lens, a laser lens, a TOF lens, and an RGB lens.

Step S802: Send the first image.

Specifically, the electronic device sends the first image to a server.

Step S803: Extract a target feature in the first image.

Specifically, the server receives the first image, and extracts the target feature in the first image, where the target feature includes at least one of color information, contour information, or material information.

Step S804: Return the target feature.

Specifically, the server returns the target feature to the electronic device.

Step S805: Send an image generation instruction.

Specifically, the electronic device sends the image generation instruction to the server, where the image generation instruction is used for instructing the server to generate a second image according to at least one of the color information, the contour information, or the material information.

Step S806: Generate a second image according to the extracted target feature.

Specifically, the server generates the second image according to at least one of the extracted color information, contour information, or material information;

Step S807: Return the second image.

Specifically, the server returns the second image to the electronic device, so that a user may set a background image of the electronic device according to the returned second image. It may be understood that, the server may return a plurality of second images to the electronic device. As shown in FIG. 7d, a plurality of second images may be generated according to the first image, and the user may set one of the plurality of second images as the background image of the electronic device according to a personal preference.

It is to be noted that, in the foregoing embodiments, there is no necessary sequence of the foregoing steps, according to the description in the embodiments of this application, a person of ordinary skill in the art may understand that in different embodiments, the foregoing steps may be performed in different sequences, that is, the steps may be performed in parallel, or the sequences may be switched.

In the embodiments of this application, by providing an image generation method, on the one hand, a first image is acquired, and a target feature of the first image is acquired according to depth information and image content information of the first image, so that a corresponding target feature can be acquired according to image information, thereby facilitating generation of diversified images; on the other hand, a second image is generated according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information. In this application, the target feature of the first image can be better used for combination to generate diversified images, thereby improving the richness of images.

It is to be noted that, the image generation method provided in this embodiment of this application may be executed by an image generation apparatus, or a control module in the image generation apparatus for performing the image generation method. In this embodiment of this application, the image generation apparatus provided in the embodiments of this application is described by using an example in which the image generation apparatus performs the image generation method.

Figure 9:
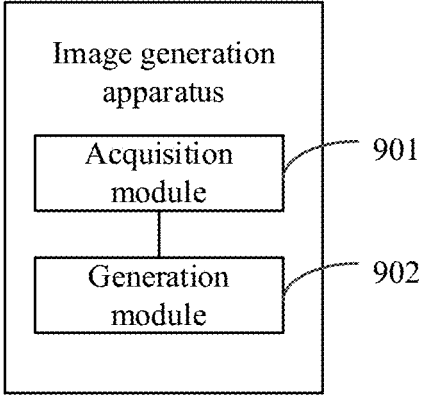
FIG. 9 is a schematic structural diagram of an image generation apparatus according to an embodiment of this application.

FIG. 9 is a schematic structural diagram of an image generation apparatus according to an embodiment of this application.

As shown in FIG. 9, the image generation apparatus includes:

an acquisition module 901, configured to: acquire a first image, where the first image includes depth information and image content information; and acquire a target feature of the first image according to the depth information and the image content information of the first image; and a generation module 902, configured to generate a second image according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information.

on the one hand, a first image is acquired, and a target feature of the first image is acquired according to depth information and image content information of the first image, so that a corresponding target feature can be acquired according to image information, thereby facilitating generation of diversified images; on the other hand, a second image is generated according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information. In this application, the target feature of the first image can be better used for combination to generate diversified images, thereby improving the richness of images. In the embodiments of this application, the acquisition module is further configured to:

determine N pieces of color information corresponding to N pixel regions in the first image; and obtain M pieces of color information according to the N pieces of color information, where the M pieces of color information do not include same color information or preset color information, both N and M are positive integers, and N≥M.

In the embodiments of this application, the acquisition module is further configured to:

after obtaining the M pieces of color information according to the N pieces of color information, classify the M pieces of color information according to chroma values of the M pieces of color information to obtain P categories, and acquire one color in the P categories, to obtain P pieces of color information, where P is a positive integer and M≥P.

In the embodiments of this application, the acquisition module is further configured to:

in a case that the first image includes at least two types of contour information, determine a contour ratio of each piece of contour information, and use Q pieces of contour information of which the contour ratio is greater than or equal to a preset first ratio threshold as the target feature, where the contour ratio of the contour information is a quantity ratio of the contour information in the first image, and Q is a positive integer; or in a case that the first image includes at least two types of material information, determine a material ratio of each piece of material information, and use R pieces of material information of which the material ratio is greater than or equal to a preset second ratio threshold as the target feature, where the material ratio of the material information is an area ratio of the material information in the first image, and R is a positive integer.

In the embodiments of this application, the generation module is further configured to:

in a case that the depth information and the image content information indicate that the first image includes a subject, determine a position of each of the Q pieces of contour information, fill the positions of the Q pieces of contour information with the P pieces of color information, and generate the second image; or in a case that the depth information and the image content information indicate that the first image does not include a subject, determine a position of each of the R pieces of material information, fill the positions of the R pieces of material information with the P pieces of color information, and generate the second image.

According to another aspect of the embodiments of this application, an embodiment of this application provides an image generation apparatus. The image generation apparatus may be a software module, and the software module includes several instructions. The several instructions are stored in a memory, and a processor may access the memory, and call the instructions for execution, to complete the image generation methods in the foregoing embodiments.

It is to be noted that, the foregoing image generation apparatus may perform the image generation method provided in the embodiments of this application, and has the corresponding functional modules for performing the method and beneficial effects thereof. For technical details not described in detail in the embodiment of the image generation apparatus, reference may be made to the image generation method provided in the embodiments of this application.

In the embodiments of this application, by providing an image generation apparatus, on the one hand, a first image is acquired, and a target feature of the first image is acquired according to depth information and image content information of the first image, so that a corresponding target feature can be acquired according to image information, thereby facilitating generation of diversified images; on the other hand, a second image is generated according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information. In this application, the target feature of the first image can be better used for combination to generate diversified images, thereby improving the richness of images.

The image generation apparatus in this embodiment of this application may be an apparatus, or may be a component, an integrated circuit, or a chip in a terminal. The apparatus may be a mobile electronic device, or may be a non-mobile electronic device. For example, the mobile electronic device may be a mobile phone, a tablet computer, a notebook computer, a palm computer, an in-vehicle electronic device, a wearable device, an ultra-mobile personal computer (UMPC), a netbook, or a personal digital assistant (PDA); and the non-mobile electronic device may be a server, a network attached storage (NAS), a personal computer (PC), a television (TV), a teller machine, or an automated machine, which are not specifically limited in the embodiments of this application.

The image generation apparatus in this embodiment of this application may be an apparatus having an operating system. The operating system may be an Android operating system, an iOS operating system, or another possible operating system, which is not specifically limited in this embodiment of this application.

The image generation apparatus provided in this embodiment of this application can implement various processes implemented in the method embodiments of FIG. 1 to FIG. 5. To avoid repetition, details are not described herein again.

Figure 10:
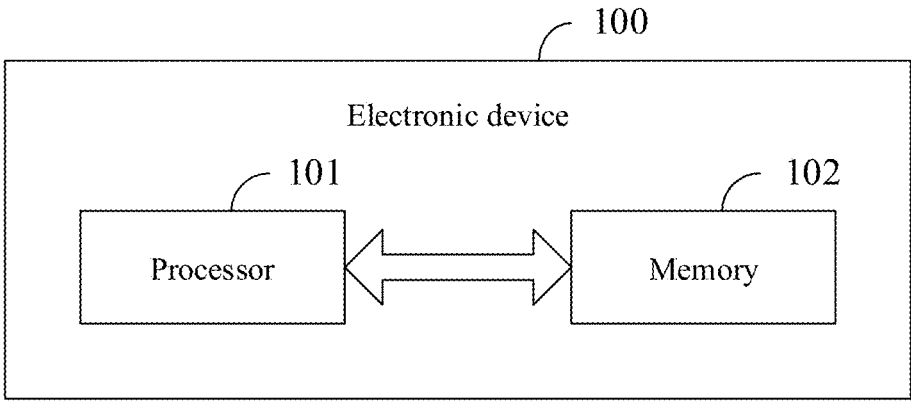
FIG. 10 is a schematic structural diagram 1 of an electronic device according to an embodiment of this application.

Optionally, FIG. 10 is a schematic structural diagram 1 of an electronic device according to an embodiment of this application. As shown in FIG. 10, an embodiment of this application further provides an electronic device 100, including a processor 101, a memory 102, and a program or instructions stored in the memory 102 and runnable on the processor 101. When the program or instructions are executed by the processor 101, various processes of the foregoing embodiment of the image generation method are implemented, and the same technical effects can be achieved. To avoid repetition, details are not described herein again.

It is to be noted that the electronic device in this embodiment of this application includes the foregoing mobile electronic device and non-mobile electronic device.

Figure 11:
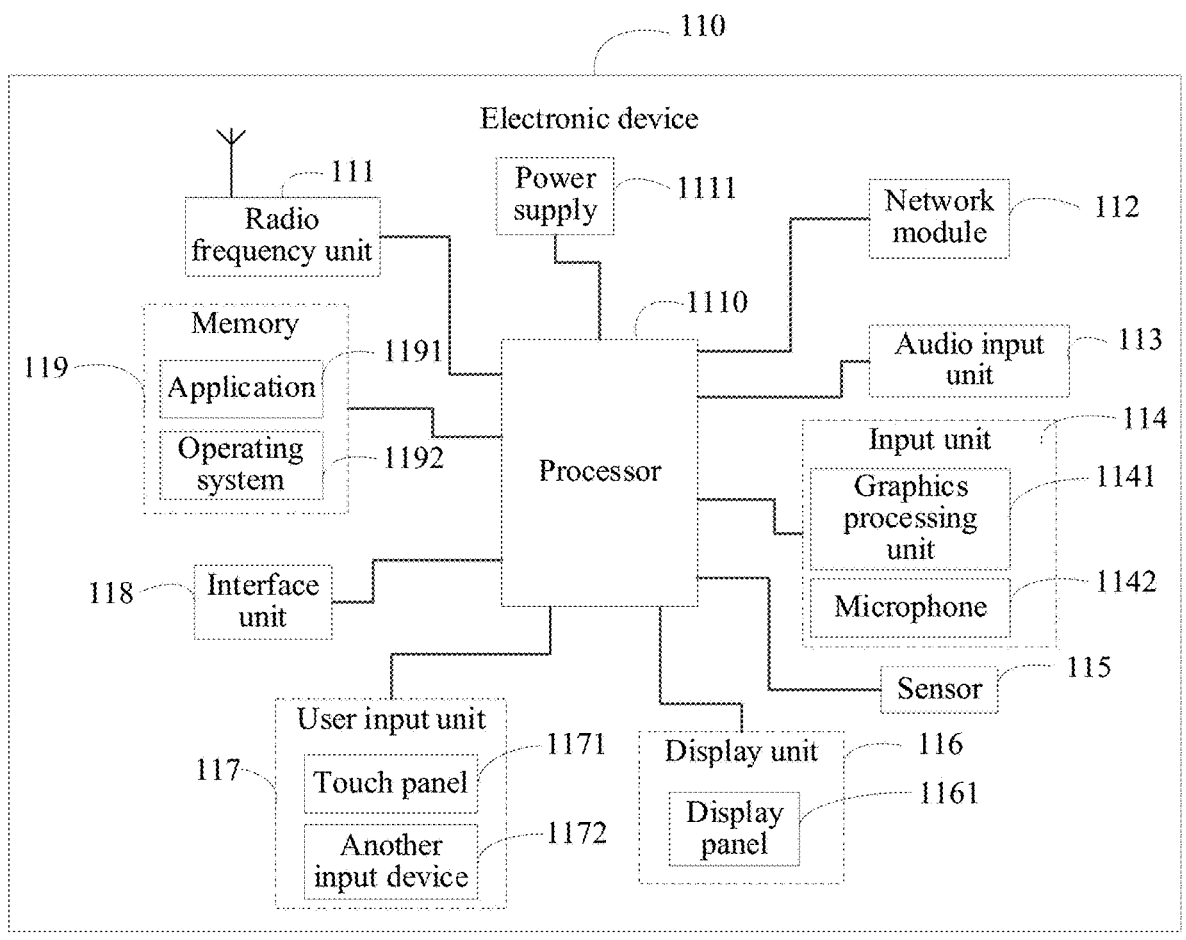
FIG. 11 is a schematic structural diagram 2 of an electronic device according to an embodiment of this application.

FIG. 11 is a schematic structural diagram 2 of an electronic device according to an embodiment of this application.

As shown in FIG. 11, the electronic device 110 includes, but not limited to: components such as a radio frequency unit 111, a network module 112, an audio output unit 113, an input unit 114, a sensor 115, a display unit 116, a user input unit 117, an interface unit 118, a memory 119, a processor 1110, and a power supply 1111. The electronic device 110 further includes a camera.

A person skilled in the art may understand that the electronic device 110 may further include the power supply (such as a battery) for supplying power to the components. The power supply may be logically connected to the processor 1110 by using a power management system, thereby implementing functions, such as charging, discharging, and power consumption management, by using the power management system. The structure of the electronic device shown in FIG. 11 constitutes no limitation on the electronic device, and the electronic device may include more or fewer components than those shown in the figure, or some components may be combined, or a different component deployment may be used. Details are not described herein again. The electronic device in the embodiments of this application includes, but is not limited to, a mobile phone, a tablet computer, a notebook computer, a palm computer, an in-vehicle terminal, a wearable device, a pedometer, and the like.

The user input unit 117 is configured to acquire a first image, where the first image includes depth information and image content information.

The processor 1110 is configured to: acquire a target feature of the first image according to the depth information and the image content information of the first image; and generate a second image according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information.

By using the electronic device provided in this embodiment of this application, on the one hand, a first image is acquired, and a target feature of the first image is acquired according to depth information and image content information of the first image, so that a corresponding target feature can be acquired according to image information, thereby facilitating generation of diversified images; on the other hand, a second image is generated according to the target feature, where the target feature includes color information, and in a case that the depth information and the image content information indicate that the first image includes a subject, the target feature further includes contour information of the subject; or in a case that the depth information and the image content information indicate that the first image does not include a subject, the target feature further includes material information. In this application, the target feature of the first image can be better used for combination to generate diversified images, thereby improving the richness of images.

Optionally, in this embodiment of this application, the processor 1110 is further configured to: determine N pieces of color information corresponding to N pixel regions in the first image; and obtain M pieces of color information according to the N pieces of color information, where the M pieces of color information do not include same color information or preset color information, both N and M are positive integers, and $N \geq M$.

Optionally, in this embodiment of this application, after obtaining the M pieces of color information according to the N pieces of color information, the processor 1110 is further configured to: classify the M pieces of color information according to chroma values of the M pieces of color information to obtain P categories, and acquire one color in the P categories, to obtain P pieces of color information, where P is a positive integer and $M \geq P$.

Optionally, in this embodiment of this application, the processor 1110 is further configured to: in a case that the first image includes at least two types of contour information, determine a contour ratio of each piece of contour information, and use Q pieces of contour information of which the contour ratio is greater than or equal to a preset first ratio threshold as the target feature, where the contour ratio of the contour information is a quantity ratio of the contour information in the first image, and Q is a positive integer; or in a case that the first image includes at least two types of material information, determine a material ratio of each piece of material information, and use R pieces of material information of which the material ratio is greater than or equal to a preset second ratio threshold as the target feature, where the material ratio of the material information is an area ratio of the material information in the first image, and R is a positive integer.

Optionally, in this embodiment of this application, the processor 1110 is further configured to:

in a case that the depth information and the image content information indicate that the first image includes a subject, determine a position of each of the Q pieces of contour information, fill the positions of the Q pieces of contour information with the P pieces of color information, and generate the second image; or in a case that the depth information and the image content information indicate that the first image does not include a subject, determine a position of each of the R pieces of material information, fill the positions of the R pieces of material information with the P pieces of color information, and generate the second image.

It is to be understood that in this embodiment of this application, the input unit 114 may include a graphics processing unit (GPU) 1141 and a microphone 1142. The graphics processing unit 1141 processes image data of a static picture or a video obtained by an image capturing apparatus (for example, a camera) in a video capturing mode or an image capturing mode. The display unit 116 may include a display panel 1161. The display panel 1161 may be configured in the form of a liquid crystal display, an organic light-emitting diode, or the like. The user input unit 117 may include a touch panel 1171 and another input device 1172. The touch panel 1171 is also referred to as a touch screen. The touch panel 1171 may include a touch detection apparatus and a touch controller. The another input device 1172 may include, but not limited to, a physical keyboard, a functional key (such as a volume control key or a switch key), a track ball, a mouse, and a joystick. Details are not described herein again. The memory 119 may be configured to store a software program and various data, including, but not limited to, an application and an operating system. The processor 1110 may integrate an application processor and a modem. The application processor mainly processes an operating system, a user interface, an application, and the like. The modem mainly processes wireless communication. It may be understood that, the foregoing modem may not be integrated into the processor 1110.

An embodiment of this application further provides a readable storage medium, storing a program or instructions, the program or instructions, when executed by a processor, implementing processes of the foregoing embodiments of the image generation method, and the same technical effects can be achieved. To avoid repetition, details will not be described herein again.

The processor is the processor in the electronic device in the foregoing embodiments. The readable storage medium includes a computer-readable storage medium, and may be, for example, a read-only memory (ROM), a random access memory (RAM), a magnetic disk, or an optical disc.

An embodiment of this application further provides a chip, including a processor and a communication interface, where the communication interface is coupled to the processor, and the processor is configured to run a program or instructions to implement processes of the foregoing embodiments of the image generation method, and the same technical effects can be achieved. To avoid repetition, details will not be described herein again.

It is to be understood that, the chip mentioned in the embodiments of this application may also be referred to as a system-level chip, a system chip, a chip system, a system on chip, or the like.

It is to be noted that, the terms "include", "include", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . " does not exclude that there are still other same elements in the processes, methods, objects, or apparatuses. In addition, it is to be noted that the scope of the methods and apparatuses in the implementations of this application is not limited to performing functions in the shown or discussed order, and may further include performing functions in a substantially simultaneous manner or in a reverse order according to the functions involved. For example, the described methods may be performed in an order different from that described, and various steps may be added, omitted, or combined. In addition, features described with reference to some examples may also be combined in other examples.

Through the descriptions of the foregoing implementations, a person skilled in the art may clearly understand that the method according to the foregoing embodiments may be implemented by software and a necessary general hardware platform, and certainly, may alternatively be implemented by hardware, but in many cases, the former manner is a better implementation. Based on such an understanding, the technical solutions of this application essentially or the part contributing to the prior art may be implemented in the form of a computer software product. The computer software product is stored in a storage medium (such as a ROM/ RAM, a magnetic disk, or an optical disc) and includes several instructions for instructing a terminal (which may be a mobile phone, a computer, a server, a network device, or the like) to perform the methods described in the embodiments of this application.

The embodiments of this application are described above with reference to the accompanying drawings. However, this application is not limited to the foregoing specific implementations. The foregoing specific implementations are merely illustrative rather than limitative. A person of ordinary skill in the art may derive various forms from this application without departing from the spirit of this application and the scope claimed by the claims, which are fall within the protection of this application.

What is claimed is:

1. An image generation method, performed by one or more processors of an electronic device, comprising:
   acquiring a first image, wherein the first image comprises depth information and image content information;
   acquiring a target feature of the first image according to the depth information and the image content information of the first image; and
   generating a second image according to the target feature, wherein the target feature comprises color information, and
   in a case that the depth information and the image content information indicate that the first image comprises a subject, the target feature further comprises contour information of the subject; or
   in a case that the depth information and the image content information indicate that the first image does not comprise a subject, the target feature further comprises material information;
   wherein the acquiring a target feature of the first image according to the depth information and the image content information of the first image comprises:
   determining N pieces of color information corresponding to N pixel regions in the first image; and
   obtaining M pieces of color information according to the N pieces of color information, wherein the M pieces of color information do not comprise same color information or preset color information, both N and M are positive integers, and N>M.

2. The method according to claim 1, wherein after the obtaining M pieces of color information according to the N pieces of color information, the method further comprises:
   classifying the M pieces of color information according to chroma values of the M pieces of color information to obtain P categories, and acquiring one color in the P categories, to obtain P pieces of color information, wherein P is a positive integer and M≥P.

3. The method according to claim 1, wherein the acquiring a target feature of the first image according to the depth information and the image content information of the first image comprises:

in a case that the first image comprises at least two types of contour information, determining a contour ratio of each piece of contour information, and using Q pieces of contour information of which the contour ratio is greater than or equal to a preset first ratio threshold as the target feature, wherein the contour ratio of the contour information is a quantity ratio of the contour information in the first image, and Q is a positive integer; or in a case that the first image comprises at least two types of material information, determining a material ratio of each piece of material information, and using R pieces of material information of which the material ratio is greater than or equal to a preset second ratio threshold as the target feature, wherein the material ratio of the material information is an area ratio of the material information in the first image, and R is a positive integer.

4. The method according to claim 3, wherein the generating a second image according to the target feature comprises:

in a case that the depth information and the image content information indicate that the first image comprises a subject, determining a position of each of the Q pieces of contour information, filling the positions of the Q pieces of contour information with P pieces of the color information, and generating the second image; or in a case that the depth information and the image content information indicate that the first image does not comprise a subject, determining a position of each of the R pieces of material information, filling the positions of the R pieces of material information with P pieces of the color information, and generating the second image.

5. A chip, comprising a processor, a non-volatile storage medium and a communication interface, wherein the communication interface is coupled to the processor, and the processor is configured to run a program or instructions stored in the non-volatile storage medium, to implement steps of the image generation method according to claim 1.

6. A computer program product, wherein the program product is stored in a non-volatile storage medium, and the program product is executed by at least one processor to implement the image generation method according to claim 1.

7. An electronic device, comprising a processor, a memory, and a program or instructions stored in the memory and runnable on the processor, wherein the memory is a non-volatile memory and the program or instructions stored therein, when executed by the processor, causes the electronic device to perform:

acquiring a first image, wherein the first image comprises depth information and image content information;

acquiring a target feature of the first image according to the depth information and the image content information of the first image; and generating a second image according to the target feature, wherein the target feature comprises color information, and in a case that the depth information and the image content information indicate that the first image comprises a subject, the target feature further comprises contour information of the subject; or in a case that the depth information and the image content information indicate that the first image does not comprise a subject, the target feature further comprises material information;

wherein the acquiring a target feature of the first image according to the depth information and the image content information of the first image comprises:

determining N pieces of color information corresponding to N pixel regions in the first image; and obtaining M pieces of color information according to the N pieces of color information, wherein the M pieces of color information do not comprise same color information or preset color information, both N and M are positive integers, and N>M.

8. The electronic device according to claim 7, wherein after the obtaining M pieces of color information according to the N pieces of color information, the program or the instruction, when executed by the processor, causes the electronic device to further perform:

classifying the M pieces of color information according to chroma values of the M pieces of color information to obtain P categories, and acquiring one color in the P categories, to obtain P pieces of color information, wherein P is a positive integer and M≥P.

9. The electronic device according to claim 7, wherein when acquiring a target feature of the first image according to the depth information and the image content information of the first image, the program or the instruction, when executed by the processor, causes the electronic device to perform:

in a case that the first image comprises at least two types of contour information, determining a contour ratio of each piece of contour information, and using Q pieces of contour information of which the contour ratio is greater than or equal to a preset first ratio threshold as the target feature, wherein the contour ratio of the contour information is a quantity ratio of the contour information in the first image, and Q is a positive integer; or in a case that the first image comprises at least two types of material information, determining a material ratio of each piece of material information, and using R pieces of material information of which the material ratio is greater than or equal to a preset second ratio threshold as the target feature, wherein the material ratio of the material information is an area ratio of the material information in the first image, and R is a positive integer.

10. The electronic device according to claim 9, wherein when generating a second image according to the target feature, the program or the instruction, when executed by the processor, causes the electronic device to perform:

in a case that the depth information and the image content information indicate that the first image comprises a subject, determining a position of each of the Q pieces of contour information, filling the positions of the Q pieces of contour information with P pieces of the color information, and generating the second image; or in a case that the depth information and the image content information indicate that the first image does not comprise a subject, determining a position of each of the R pieces of material information, filling the positions of the R pieces of material information with P pieces of the color information, and generating the second image.

11. A non-transitory readable storage medium, storing a program or instructions, wherein the program or instructions, when executed by a processor, causes the processor to perform:

acquiring a first image, wherein the first image comprises depth information and image content information;

acquiring a target feature of the first image according to the depth information and the image content information of the first image; and generating a second image according to the target feature, wherein the target feature comprises color information, and in a case that the depth information and the image content information indicate that the first image comprises a subject, the target feature further comprises contour information of the subject; or in a case that the depth information and the image content information indicate that the first image does not comprise a subject, the target feature further comprises material information;

wherein when acquiring a target feature of the first image according to the depth information and the image content information of the first image, the program or the instruction, when executed by the processor, causes the processor to perform:

determining N pieces of color information corresponding to N pixel regions in the first image; and obtaining M pieces of color information according to the N pieces of color information, wherein the M pieces of color information do not comprise same color information or preset color information, both N and M are positive integers, and N≥M.

12. The non-transitory readable storage medium according to claim 11, wherein after the obtaining M pieces of color information according to the N pieces of color information, the program or the instruction, when executed by the processor, causes the processor to further perform:

classifying the M pieces of color information according to chroma values of the M pieces of color information to obtain P categories, and acquiring one color in the P categories, to obtain P pieces of color information, wherein P is a positive integer and M≥P.

13. The non-transitory readable storage medium according to claim 11, wherein when acquiring a target feature of the first image according to the depth information and the image content information of the first image, the program or the instruction, when executed by the processor, causes the processor to perform:

in a case that the first image comprises at least two types of contour information, determining a contour ratio of each piece of contour information, and using Q pieces of contour information of which the contour ratio is greater than or equal to a preset first ratio threshold as the target feature, wherein the contour ratio of the contour information is a quantity ratio of the contour information in the first image, and Q is a positive integer; or in a case that the first image comprises at least two types of material information, determining a material ratio of each piece of material information, and using R pieces of material information of which the material ratio is greater than or equal to a preset second ratio threshold as the target feature, wherein the material ratio of the material information is an area ratio of the material information in the first image, and R is a positive integer.

14. The non-transitory readable storage medium according to claim 13, wherein when generating a second image according to the target feature, the program or the instruction, when executed by the processor, causes the processor to perform:

in a case that the depth information and the image content information indicate that the first image comprises a subject, determining a position of each of the Q pieces of contour information, filling the positions of the Q pieces of contour information with P pieces of the color information, and generating the second image; or in a case that the depth information and the image content information indicate that the first image does not comprise a subject, determining a position of each of the R pieces of material information, filling the positions of the R pieces of material information with P pieces of the color information, and generating the second image.

* * * * *